United States Patent
Krishna et al.

(10) Patent No.: US 11,654,904 B1
(45) Date of Patent: May 23, 2023

(54) VEHICULAR TRAFFIC ADVERSE EVENT MONITORING MECHANISM

(71) Applicant: International Business Machines Corporation, Armonk, NY (US)

(72) Inventors: Hariharan Krishna, Bangalore (IN); Venkata Vara Prasad Karri, Visakhapatnam (IN); Shailendra Moyal, Pune (IN); Srikanth Vankara, Visakhapatnam (IN); Sekhar Reddy Dandu Reddy, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 17/644,820

(22) Filed: Dec. 17, 2021

(51) Int. Cl.
| | |
|---|---|
| H04N 5/44 | (2011.01) |
| B60W 30/095 | (2012.01) |
| B60W 50/00 | (2006.01) |
| B60W 50/14 | (2020.01) |
| B60W 40/02 | (2006.01) |
| H04W 4/40 | (2018.01) |

(52) U.S. Cl.
CPC ........ B60W 30/0956 (2013.01); B60W 40/02 (2013.01); B60W 50/0097 (2013.01); B60W 50/14 (2013.01); H04W 4/40 (2018.02); B60W 2050/146 (2013.01); B60W 2554/4044 (2020.02); B60W 2554/80 (2020.02); B60W 2555/20 (2020.02); B60W 2556/10 (2020.02); B60W 2556/45 (2020.02)

(58) Field of Classification Search
CPC ............. B60W 30/0956; B60W 40/02; B60W 50/0097; B60W 50/14; B60W 2050/146; B60W 2554/4044; B60W 2554/80; B60W 2555/20; B60W 2556/10; B60W 2556/45; H04W 4/40
See application file for complete search history.

(56) References Cited

U.S. PATENT DOCUMENTS

| | | | |
|---|---|---|---|
| 10,024,684 B2 | 7/2018 | Wang | |
| 10,395,521 B2 | 8/2019 | Bansal | |
| 10,909,866 B2 * | 2/2021 | Jacobus | ........... G08G 1/096716 |
| 11,490,234 B2 * | 11/2022 | Haran | .................... G08G 1/162 |
| 2017/0167885 A1 | 6/2017 | Adderly | |
| 2018/0086263 A1 | 3/2018 | Moradi-Pari | |

(Continued)

FOREIGN PATENT DOCUMENTS

KR            101685900 B1     12/2016

OTHER PUBLICATIONS

"GPS Equipment Industry Outlook, 2030: Increasing Use of GPS Tracking Devices in Commercial Vehicles to Increase Logistical Efficiencies", Research and Markets, Apr. 20, 2020, 6 pgs., <https://www.globenewswire.com/news-release/2020/04/20/2018536/0/en/GPS-Equipment-Industry-Outlook-2030-Increasing-Use-of-GPS-Tracking-Devices-in-Commercial-Vehicles-to-Increase-Logistical-Efficiencies.html>.

*Primary Examiner* — Munear T Akki
(74) *Attorney, Agent, or Firm* — David B. Woycechowsky

(57) ABSTRACT

An advanced driver-assistance system (ADAS) that performs accident prediction by taking into account at least the following types of data: (i) current information about vehicles in proximity of a first vehicle; (ii) data about the direction of travel of vehicles in the proximity of the first vehicle; (iii) historical data about erratic driving that has previously occurred in proximity of the first vehicle; and (iv) historical data about vehicular accidents that have previously occurred in proximity of the first vehicle.

18 Claims, 3 Drawing Sheets

(56) References Cited

U.S. PATENT DOCUMENTS

| | | | |
|---|---|---|---|
| 2018/0109924 A1 | 4/2018 | Agrawal | |
| 2020/0013244 A1 | 1/2020 | Rosenbaum | |
| 2020/0111355 A1 | 4/2020 | Alcazar | |
| 2020/0342760 A1* | 10/2020 | Vassilovski | G05D 1/0289 |
| 2020/0410852 A1* | 12/2020 | Lee | B60W 30/14 |
| 2021/0000896 A1 | 1/2021 | Mazoyer | |
| 2021/0107494 A1* | 4/2021 | Silver | B60W 50/06 |
| 2021/0110181 A1* | 4/2021 | Hsu | G08G 1/04 |
| 2021/0179111 A1* | 6/2021 | Kim | B60W 60/0016 |
| 2021/0237735 A1* | 8/2021 | Ha | G08G 1/166 |
| 2021/0284066 A1 | 9/2021 | Pedersen | |
| 2021/0294342 A1* | 9/2021 | Marasigan | G06F 16/2379 |
| 2022/0013007 A1* | 1/2022 | Balasubramanian | H04W 4/40 |
| 2022/0013014 A1* | 1/2022 | Xu | G01C 21/3697 |

\* cited by examiner

VEHICULAR TRAFFIC ADVERSE EVENT MONITORING MECHANISM

BACKGROUND

The present invention relates generally to the field of computer systems (for example, software running on computers and over computer networks) that promote safe driving.

The Wikipedia entry for "Advanced Driver-Assistance Systems" (as of Aug. 04, 2021) states, in part, as follows: "Advanced driver-assistance systems (ADAS) are groups of electronic technologies that assist drivers in driving and parking functions. Through a safe human-machine interface, ADAS increase car and road safety. ADAS use automated technology, such as sensors and cameras, to detect nearby obstacles or driver errors, and respond accordingly. As most road accidents occur due to human error, ADAS are developed to automate, adapt, and enhance vehicle technology for safety and better driving. ADAS are proven to reduce road fatalities by minimizing human error. Safety features are designed to avoid accidents and collisions by offering technologies that alert the driver to problems, implementing safeguards, and taking control of the vehicle if necessary. Adaptive features may automate lighting, provide adaptive cruise control, assist in avoiding collisions, incorporate satellite navigation and traffic warnings, alert drivers to possible obstacles, assist in lane departure and lane centering, provide navigational assistance through smartphones, and provide other features." (footnote(s) omitted)

In some conventional ADAS, erratic drivers and the behavior that characterize erratic driving are used as a basis for providing a responsive action, such as an alert to vehicles in proximity of the erratic driver and/or erratic driving. Some embodiments of the present invention may be directed ADAS's that include this conventional feature of detection of and response to erratic driving behavior.

SUMMARY

According to an aspect of the present invention, there is a method, computer program product and/or system that performs the following operations (not necessarily in the following order): (i) during operation of a first vehicle, receiving, by an advanced driver-assistance system (ADAS), a vehicle operation situational data set including information indicative of at least the following: (a) current information about vehicles in proximity of the first vehicle; (b) data about the direction of travel of vehicles in the proximity of the first vehicle; (c) historical data about erratic driving that has previously occurred in proximity of the first vehicle; and (d) historical data about vehicular accidents that have previously occurred in proximity of the first vehicle; (ii) performing, by machine logic of the ADAS, accident prediction, to obtain an accident likelihood status, based at least upon the following factors: (a) current information about vehicles in proximity of the first vehicle; (b) data about the direction of travel of vehicles in the proximity of the first vehicle; (c) historical data about erratic driving that has previously occurred in proximity of the first vehicle; and (d) historical data about vehicular accidents that have previously occurred in proximity of the first vehicle; and (iii) communicating the accident likelihood status to an operator of the first vehicle.

DETAILED DESCRIPTION

Figure 1:
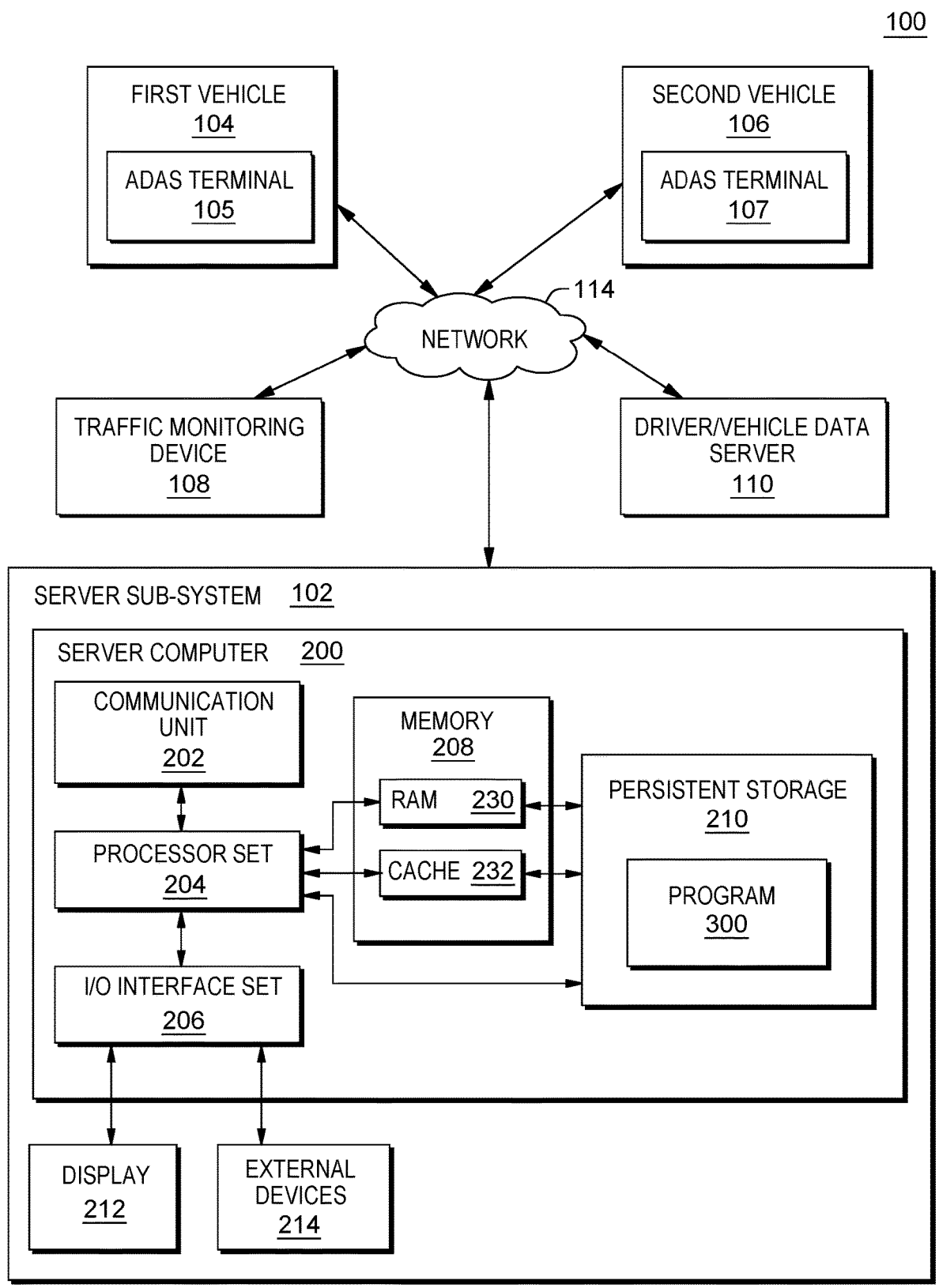
FIG. 1 is a block diagram view of a first embodiment of a system according to the present invention.

Some embodiments of the present invention include machine logic for performing accident prediction based different metadata gathered from a driver's computer device (for example, smartphone, vehicle mounted GPS device) that relates to the driver's current driving context. Some embodiments are directed toward an advanced driver-assistance system (ADAS) that includes machine logic that bases accident prediction, at least in part, upon the following factors: (i) data about vehicles in the proximity of the ADAS-equipped vehicle; (ii) data about the direction of travel of vehicles in the proximity; (iii) historical data about erratic driving has previously a happened in the proximity of the ADAS equipped vehicle; and/or (iv) historical data about vehicular accidents that have previously happened in the proximity of the ADAS equipped vehicle.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); first vehicle 104; ADAS (advanced driver-assistance system) terminal 105; second vehicle 106; ADAS terminal 107; traffic monitoring device 108; driver/vehicle data server 110; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer"

in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
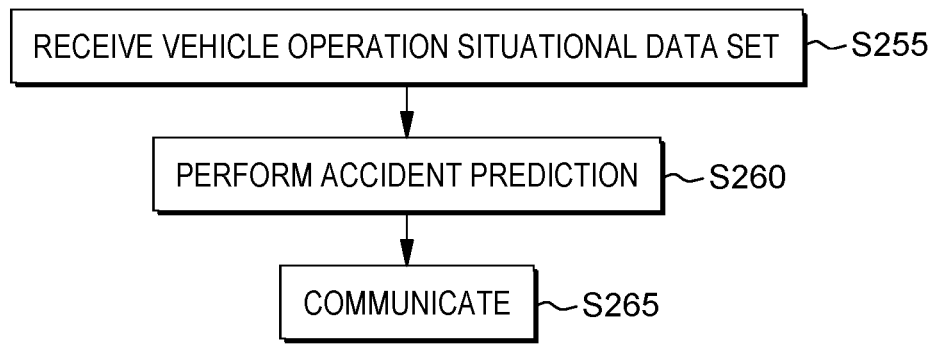
FIG. 2 is a flowchart showing a first embodiment method performed, at least in part, by the first embodiment system.
Figure 3:
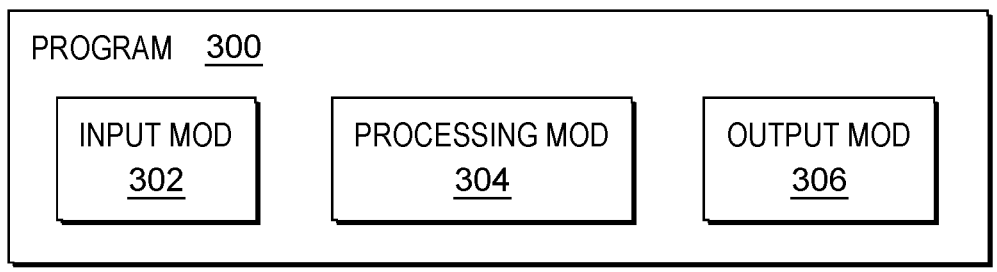
FIG. 3 is a block diagram showing a machine logic (for example, software) portion of the first embodiment system.

As shown in FIG. 1, networked computers system 100 is an environment in which an example method according to the present invention can be performed. In this embodiment, computer system 100 is an ADAS. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Figure 4:
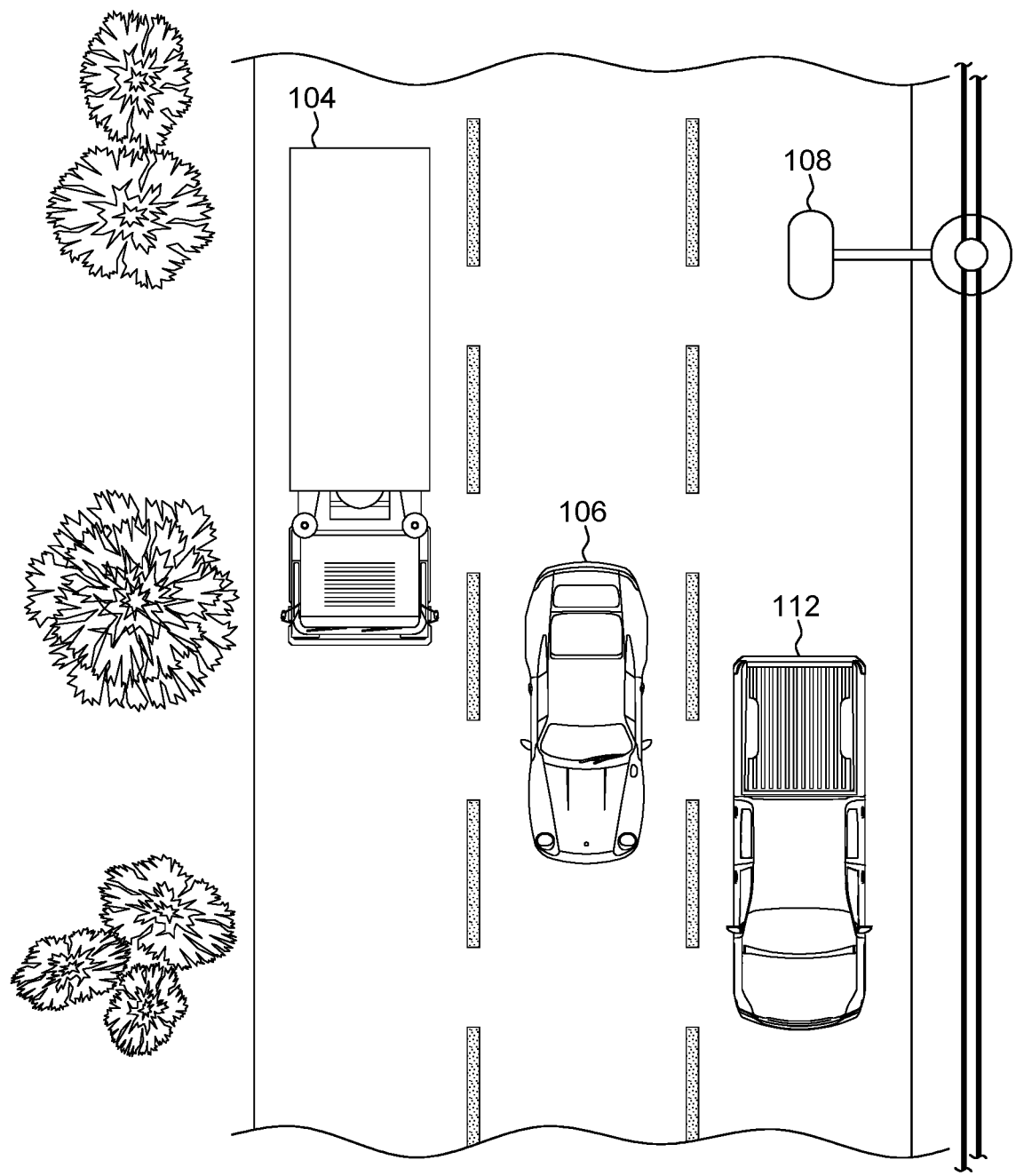
FIG. 4 is a screenshot view generated by the first embodiment system.

Processing begins at operation S255, which occurs during operation of first vehicle 104, as shown in overhead road environment view 400 of FIG. 4. As shown in FIG. 1, first vehicle 104 is equipped with ADAS terminal 105. In this embodiment, the machine logic that drives the ADAS is located in server subsystem 102, which is remote to the first vehicle and communicates data wirelessly with ADAS terminals 105 and 107. Alternatively, some, or all of the machine logic that drives the ADAS may be located in the vehicle. In this particular example, at operation S255, input module ("mod") 302, receives a vehicle operation situational data set including information indicative of the following: (i) current information about vehicles in proximity of the first vehicle (see FIG. 4 at second vehicle 106, which is also equipped with ADAS terminal 107, and also proximate vehicle 112); (ii) data about the direction of travel of vehicles in the proximity of the first vehicle; (iii) historical data about erratic driving that has previously occurred in proximity of the first vehicle; (iv) historical data about vehicular accidents that have previously occurred in proximity of the first vehicle; (v) contextual weather information at a current and/or future forecasted point of time (for example, rainy or foggy weather with different temperature that might effect lighting and reflecting issues or tire frictions etc.); and (vi) time of the day (for example, midnight). Item (vi) on the foregoing list may filter or prioritize the historical data with more precision. Because first vehicle 104 is travelling along various roads, the proximate vehicles and proximate locations to first vehicle 104 will change over time.

In this example, the vehicle situational operational vehicle data set includes data received by the input mod from: (i) ADAS terminal 105; (ii) ADAS terminal 107; (iii) traffic monitoring device 108; and (iv) driver/vehicle data server 110 (for example, a governmental department of motor vehicles type data server).

Processing proceeds to operation S260, where processing mod 304 performs accident prediction to obtain an accident likelihood status, based at least upon the following factors: (i) current information about vehicles in proximity of the first vehicle; (ii) data about the direction of travel of vehicles in the proximity of the first vehicle; (iii) historical data about erratic driving that has previously occurred in proximity of the first vehicle; and (iv) historical data about vehicular accidents that have previously occurred in proximity of the first vehicle. In this example, the accident likelihood status is green (as opposed to yellow or red) because the first vehicle is driving down a straight stretch of road that can comfortably accommodate all of the proximate vehicles that are travelling on it, and travelling on it in the same direction as the first vehicle (see overhead road environment view 400). Alternatively, the accident likelihood status could be expressed numerically (for example, one for low accident probability, two for medium accident probability and three for high accident probability).

Processing proceeds to operation S265, where output mod 306 communicates the accident likelihood status to an operator of the first vehicle. In this example, the accident likelihood status is displayed on a display built into ADAS 105 so that the human operator of the first vehicle can see it. Alternatively, the first vehicle may be a driverless vehicle.

Some additional comments relating to overhead road environment view 400: (i) first vehicle 104 also receives a customized recommendation for driving; (ii) proximate vehicle 106 is especially close to first vehicle 104, so it is especially important that this driver and vehicle have a low probability of mishaps; and (iii) in some embodiments first vehicle 104 may receive the following message from the ADAS: "Alert for the car driving nearby with attributes."

III. FURTHER COMMENTS AND/OR EMBODIMENTS

Some embodiments of the present invention recognize the following facts, potential problems and/or potential areas for improvement with respect to the current state of the art: (i) road traffic injuries cause considerable economic losses to individuals, their families, and to nations as a whole; (ii) losses arise from the cost of treatment as well as lost productivity for those killed or disabled by their injuries, and for family members who need to take time off work or school to care for the injured; (iii) the cause causes and/or factors that contribute to vehicular accidents and associated damage include drivers not being aware of road conditions, route, speed and climatic conditions; and/or (iv) traffic congestion, vehicle density, etc., are being displayed today in maps displayed on a driver's smartphone and/or vehicle mounted GPS (global positioning system) device.

Some embodiments of the present invention may include one, or more, of the following operations, features, characteristics and/or advantages: (i) addresses the problem of accidents or mishap by identifying the user expertise for a particular vehicle type; and/or (ii) accordingly generates weight for all the vehicles the user owns and also for different vehicle types for a particular route and road conditions and displays the results on a GPS by tagging the user accordingly.

A method according to an embodiment of the present invention includes the following operations (not necessarily in the following order): (i) a system which enables a communication platform for the drivers to notify his/her level of driving in terms of experience in years and type of vehicle, such as left steering or right steering, etc.; (ii) notifies the GPS system on the type of other passengers in the vehicle (pregnant, patient, learner permit driver, ambulance, urgent, etc.); and (iii) the system validates the data and uploads the data to the cloud before showing it on a GPS.

A method according to an embodiment of the present invention includes the following operations (not necessarily in the following order): (i) the system that enables the communication platform (mode of communication) for the drivers, passengers, fleet owners and community of people to understand the driving exposure of the drivers extracted from a multitude of vehicles. based on: (a) experience (patient, learner permit holder); and (b) the state of the driving requirement (emergency/ambulance) traveling in the same route; (ii) the system also is intelligent to identify the past experience of the driver (for example: a person driving a truck has suddenly started driving a hatchback and is traveling the same route); (iii) the system allows the user to prepare the travel route based on the data provided (for example, a person with past accident experience is traveling the same route); and (iv) the system also helps in providing the lane that is the safest to travel in based on vehicles close by and driver information derived from the above inference algorithm.

A method according to an embodiment of the present invention includes the following operations (not necessarily in the following order): (i) the driver can choose a setting and notify the status using his/her GPS, can mask it, or vice-a-versa; (ii) the said vehicle with IoT (internet of things) capabilities can communicate with other vehicles and display on their GPS information about the approaching vehicle based on the sensor feed; (iii) identifies the lane in which the driver is driving (GPS based) and provides recommendations and warnings based on his/her experience and mode of carrier (pregnant, patient, learner driver, ambulance, urgent, etc.) derived and validated in item (i) above; and (iv) analyzes and predicts the accident possibility based on the existing drivers experience (driver-1) and the experience of the second driver (driver-2) coming in the opposite direction or the same direction (overtake) and provides the required warnings (during overtake or curve cross or hair pin curves) based on the GPS using sensor feed and real time analytics.

A method according to an embodiment of the present invention includes the following operations (not necessarily in the following order): (i) identifies the lane in which the driver is driving (GPS based) and provides recommendations and warnings based on his/her experience and mode of carrier (limited color vision, patient, learner driver, ambulance, urgent, etc.); (ii) identifies the past carrier experience (driver using an SUV (sport utility vehicle) earlier and currently using a sedan); (iii) can allow the driver to use a GPS as a medium to notify other people subscribed to the system using information stored in the cloud; (iv) the system considers various parameters of driving context, road conditions, passenger situation, etc., such as but not limited to driver experience, driving behavior, road conditions, vehicle condition, passenger health, passenger behavior, etc., and (v) assesses all such parameters where the system automatically creates a 360 degree virtual boundary/periphery.

A method according to an embodiment of the present invention includes the following operations (not necessarily in the following order): (i) the system considers other vehicles getting into the virtual boundary or about to get into proximity of the defined virtual boundary, suggests to both vehicles to take the necessary action of slowing down, with the appropriate indicator on the situation such as there is a patient passenger on-board and the driving speed has to be limited; (ii) the system, further to control the overall traffic route based on derived various driving limits of each vehicle in a controlled environment, further derives the virtual lanes in which each vehicle should drive to have a seamless regulation and flow of traffic to avoid unnecessary mishaps such as constant honking, driving irritations, collisions, etc.; and (iii) the system records the activity of driving based on the identified driver, vehicle, passenger situation and further derives a credit score which can be tagged using a governmental system to automatically suggest driver training programs to avoid future mishaps.

Some embodiments of the present invention may include one, or more, of the following operations, features, characteristics and/or advantages: (i) the system is associated with existing providers such as GPS, Google maps, etc.; (ii) a new subscriber has to register to use the service with his/er vehicle details (it could be an SUV, MUV (multi-utility vehicle), etc.) along with the users profile; (iii) a new subscriber can be a new vehicle buyer or an existing driver (driver experience is also considered as one of the key inputs); and/or (iv) once the subscriber information is added, a separate mapping is done for all the vehicle drivers (including non-subscribers) for deep dive analysis.

Some embodiments of the present invention may include one, or more, of the following operations, features, characteristics and/or advantages: (i) once the feature is turned on, the monitoring system is turned on and the GPS notifications are provided to the driver based on the driving attributes, which are provided on demand when the user ops in for the service; (ii) the notification could be either warnings/alert or recommendations to the driver or autonomous vehicles for the identified risks and mishap probability; (iii) the notification would be generated by performing real time analytics on the attributes provided by vehicles at run-time with the capability and real time situation of the vehicle (that is, driver, passenger information, vehicle condition, etc.; (iv) the system will be integrated with current GPS systems to enhance the end user experience with driving enriched with more useful data; (v) registered users to the cloud platform running the service in the background captures users profile, contact info, tiers of friends with a frequent contacts list in the unified view in JSON (JavaScript object notation) script; and/or (vi) as the information is subject to SSM (sensitive subject matter), all the information is parsed post users permissions into the NoSQL (not only structured query language) database.

Some embodiments of the present invention may include one, or more, of the following operations, features, characteristics and/or advantages: (i) uses contextual information about two vehicles/drivers coming in the same or different directions and calculation of accident possibility; (ii) includes data about drivers in other vehicle(s); (iii) merges the data with driving behavior of the driver and associates the passenger information with their conditions to analyze the data and prepare the travel plan with lanes, routes, etc.; and/or (iii) improves the function of the GPS itself to help drivers by displaying all the aspects he/she should follow to avoid accidents and mishaps.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
during operation of a first vehicle, receiving, by an advanced driver-assistance system (ADAS), a vehicle operation situational data set including information indicative of at least the following: (i) current information about vehicles in proximity of the first vehicle; (ii) data about the direction of travel of vehicles in the proximity of the first vehicle; (iii) historical data about erratic driving that has previously occurred in proximity of the first vehicle; and (iv) historical data about vehicular accidents that have previously occurred in proximity of the first vehicle;

performing, by machine logic of the ADAS, accident prediction, to obtain an accident likelihood status, based at least upon the following factors: (i) current information about vehicles in proximity of the first vehicle; (ii) data about the direction of travel of vehicles in the proximity of the first vehicle; (iii) historical data about erratic driving that has previously occurred in proximity of the first vehicle; and (iv) historical data about vehicular accidents that have previously occurred in proximity of the first vehicle; and communicating the accident likelihood status to an operator of the first vehicle.

2. The CIM of claim 1 wherein the vehicle operation situational data set further includes information indicative of the following: contextual weather information at a current and/or future forecasted point of time, and time of the day.

3. The CIM of claim 1 wherein:
the first vehicle is a driverless vehicle; and
the operator of the first vehicle is a set of machine logic that controls operation of the first vehicle.

4. The CIM of claim 1 wherein the accident likelihood status is expressed as a number.

5. The CIM of claim 1 wherein the machine logic of the ADAS is substantially located in the first vehicle.

6. The CIM of claim 1 wherein the machine logic of the ADAS is substantially located remotely from the first vehicle and communicates with the first vehicle by wireless communication.

7. A computer program product (CPP) comprising:
a set of storage device(s); and
computer code stored collectively in the set of storage device(s), with the computer code including data and instructions to cause a processor(s) set to perform at least the following operations:
during operation of a first vehicle, receiving, by an advanced driver-assistance system (ADAS), a vehicle operation situational data set including information indicative of at least the following: (i) current information about vehicles in proximity of the first vehicle; (ii) data about the direction of travel of vehicles in the proximity of the first vehicle; (iii) historical data about erratic driving that has previously occurred in proximity of the first vehicle; and (iv) historical data about vehicular accidents that have previously occurred in proximity of the first vehicle;
performing, by machine logic of the ADAS, accident prediction, to obtain an accident likelihood status, based at least upon the following factors: (i) current information about vehicles in proximity of the first vehicle; (ii) data about the direction of travel of vehicles in the proximity of the first vehicle; (iii) historical data about erratic driving that has previously occurred in proximity of the first vehicle; and (iv) historical data about vehicular accidents that have previously occurred in proximity of the first vehicle; and
communicating the accident likelihood status to an operator of the first vehicle.

8. The CPP of claim 7 wherein the vehicle operation situational data set further includes information indicative of the following: contextual weather information at a current and/or future forecasted point of time, and time of the day.

9. The CPP of claim 7 wherein:
the first vehicle is a driverless vehicle; and
the operator of the first vehicle is a set of machine logic that controls operation of the first vehicle.

10. The CPP of claim 7 wherein the accident likelihood status is expressed as a number.

11. The CPP of claim 7 wherein the machine logic of the ADAS is substantially located in the first vehicle.

12. The CPP of claim 7 wherein the machine logic of the ADAS is substantially located remotely from the first vehicle and communicates with the first vehicle by wireless communication.

13. A computer system (CS) comprising:
a processor(s) set;
a set of storage device(s); and
computer code stored collectively in the set of storage device(s), with the computer code including data and instructions to cause the processor(s) set to perform at least the following operations:
during operation of a first vehicle, receiving, by an advanced driver-assistance system (ADAS), a vehicle operation situational data set including information indicative of at least the following: (i) current information about vehicles in proximity of the first vehicle; (ii) data about the direction of travel of vehicles in the proximity of the first vehicle; (iii) historical data about erratic driving that has previously occurred in proximity of the first vehicle; and (iv) historical data about vehicular accidents that have previously occurred in proximity of the first vehicle;
performing, by machine logic of the ADAS, accident prediction, to obtain an accident likelihood status, based at least upon the following factors: (i) current information about vehicles in proximity of the first vehicle; (ii) data about the direction of travel of vehicles in the proximity of the first vehicle; (iii) historical data about erratic driving that has previously occurred in proximity of the first vehicle; and (iv) historical data about vehicular accidents that have previously occurred in proximity of the first vehicle; and
communicating the accident likelihood status to an operator of the first vehicle.

14. The CS of claim 13 wherein the vehicle operation situational data set further includes information indicative of the following: contextual weather information at a current and/or future forecasted point of time, and time of the day.

15. The CS of claim 13 wherein:
the first vehicle is a driverless vehicle; and
the operator of the first vehicle is a set of machine logic that controls operation of the first vehicle.

16. The CS of claim 13 wherein the accident likelihood status is expressed as a number.

17. The CS of claim 13 wherein the machine logic of the ADAS is substantially located in the first vehicle.

18. The CS of claim 13 wherein the machine logic of the ADAS is substantially located remotely from the first vehicle and communicates with the first vehicle by wireless communication.

* * * * *